J. G. A. KITCHEN & I. H. STOREY.
PNEUMATIC TIRE.
APPLICATION FILED OCT. 31, 1910.

1,011,305.

Patented Dec. 12, 1911.

Witnesses
J. P. Connor
C. M. Crawford

Inventors
John George A. Kitchen
and Isaac Henry Storey
by B. Singer
Attorney

COLUMBIA PLANOGRAPH CO., WASHINGTON, D. C.

UNITED STATES PATENT OFFICE.

JOHN GEORGE AULSEBROOK KITCHEN, OF LANCASTER, AND ISAAC HENRY STOREY, OF AMBLESIDE, ENGLAND.

PNEUMATIC TIRE.

1,011,305.   Specification of Letters Patent.   Patented Dec. 12, 1911.

Application filed October 31, 1910. Serial No. 590,009.

*To all whom it may concern:*

Be it known that we, JOHN GEORGE AULSEBROOK KITCHEN and ISAAC HENRY STOREY, subjects of the King of Great Britain and Ireland, residing, respectively, at Lancaster, in the county of Lancaster, and Ambleside, in the county of Westmoreland, England, have invented certain new and useful Improvements in Pneumatic Tires, of which the following is a specification.

This invention relates to improvements in the kind of tire described in the specification of Letters Patent of the United States, No. 948,701, of February 8, A. D. 1910.

The object of the invention is to make a sectional tire similar to that therein described but without the short internally fitting segments which cover the joint between two principal segments, the usual air tube or chamber of the tire being modified to act as a substitute for the said internal segments.

Figure 1:
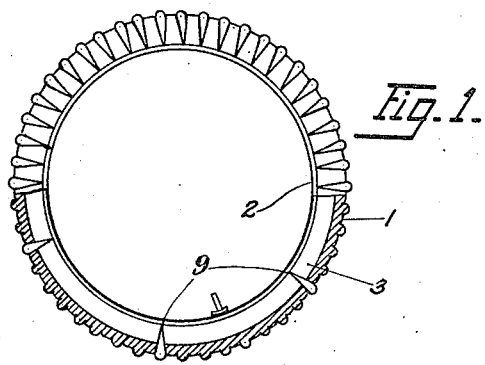
Figure 4:
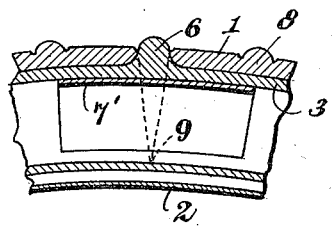
Figure 2:
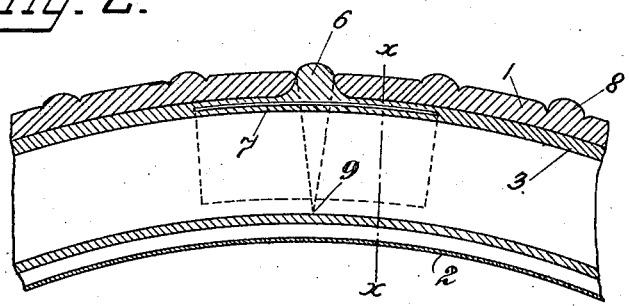
Figure 3:
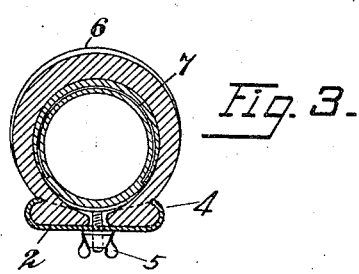

In the drawing attached hereunto, Figure 1, represents an elevation of the improved tire and rim partly in section; Fig. 2 an enlarged partial longitudinal section and Fig. 3 a cross section at $x, x$, Fig. 2. Fig. 4 is an enlarged partial longitudinal section through a tire showing the modified form of reinforcement.

In Fig. 1, the tire segments are represented by 1, the rim by 2 and the air chamber or tube by 3. Each segment is secured to the rim in the usual way by means of beaded edges 4 and preferably additionally secured by bolts 5 as usual.

Between the segments 1 the ends of which are preferably cut so as to meet at the rim, a space is left on the tread part and sides, and the tube 3 is provided with transverse ridges 6 adapted to fit between the ends of the segments and slightly project above the surface thereof. Where the segments join the ridges 6, the tube 3 is strengthened also, by fabric or canvas insertions such as 7, or alternatively the tube may be lined for a similar length, as shown at 7' of Fig. 4, the insertions or linings being also in sections so that the longitudinal elasticity of the tube is not much interfered with. The segments 1 are in the drawing shown with molded ridges 8. The molded ridges 6 of the air tube preferably come to a knife edge above the rim as at 9, Figs. 1 and 2.

What we claim as our invention and desire to secure by Letters Patent is:

In a pneumatic tire the combination of an outer jacket consisting of longitudinal segments spaced apart at the tread part and of an air tube formed with transverse ridges adapted to fill in the spaces between the said segments.

In testimony whereof we have hereunto affixed our signatures in the presence of two witnesses.

Signed at Lancaster this 20th day of October 1910.

JOHN GEORGE AULSEBROOK KITCHEN.
  ISAAC HENRY STOREY.

Witnesses:
  JAMES HARRISON SHEPHERD,
  ROBERT WILSON HOWSON.

---

Copies of this patent may be obtained for five cents each, by addressing the "Commissioner of Patents, Washington, D. C."